Dec. 2, 1969  W. R. PARKHURST  3,481,630
TRAILER HITCH ASSEMBLY
Filed Dec. 12, 1968

INVENTOR
William R. Parkhurst

BY Schmidt, Johnson, Hovey,
Williams & Bradley.
ATTORNEYS.

United States Patent Office 3,481,630
Patented Dec. 2, 1969

3,481,630
TRAILER HITCH ASSEMBLY
William R. Parkhurst, Sedalia, Mo., assignor to Parkhurst Manufacturing Company, Sedalia, Mo., a corporation of Missouri
Continuation-in-part of application Ser. No. 621,965, Mar. 9, 1967. This application Dec. 12, 1968, Ser. No. 783,286
Int. Cl. B60d 1/14, 7/00
U.S. Cl. 280—502        7 Claims

ABSTRACT OF THE DISCLOSURE

A trailer hitch for coupling a towed vehicle to attachable structure in the nature of the bumper and frame bracket of a towing vehicle, the trailer hitch including a drawbar having a pair of spaced-apart hitch units which are carried by the drawbar, the hitch units each having a mount which engages the bumper of the towing vehicle, the mount being attached to the bumper and to the frame bracket of the towing vehicle, there being take-up means for the attachment mechanism, the take-up means being carried by a sleeve which is an integral part of the mount whereby, when the take-up means is actuated the same moves into engagement with the drawbar to retain the drawbar with respect to the mount and thereby securely attach the hitch to the towing vehicle.

Cross-references

This application is a continuation-in-part of application Ser. No. 621,965, filed Mar. 9, 1967 now Patent No. 3,423,106, and entitled "Trailer Hitch."

It is the primary object of this invention to provide a trailer hitch assembly which can be quickly and securely attached to structure on a towing vehicle, the components of the trailer hitch assembly being of such a nature as to accommodate the attachable structure which is in the nature of a bumper and frame brackets carried by virtually all presently known vehicles, all to the end that the trailer hitch assembly may be universally used to couple a towed vehicle to a towing vehicle.

It is yet another important object of this invention to provide a trailer hitch assembly wherein the drawbar, which forms a part thereof, is positioned as closely as possible to the bumper of the towing vehicle to thereby dispose the load of the towed vehicle on a ball which is carried by the drawbar and which is positioned in close proximity to the bumper of the towing vehicle.

Another important aim of this invention is to provide a trailer hitch assembly which includes a drawbar having a pair of hitch units reciprocable longitudinally thereof and carried thereby, the hitch units each including a mount, which mount has a tubular portion telescoped over the drawbar; a sleeve which is integral with the tubular portion; and a plate which embraces the sleeve, there being first and second releasable mechanisms for attaching the mount to the bumper and frame bracket of the towing vehicle, the second releasable mechanism being coupled with take-up means which is carried by the sleeve of the mount, the various components being positioned in such a manner that when the take-up means is actuated a portion thereof moves into engagement with the drawbar to thereby tightly clamp and retain the same with respect to the mount.

Other objects include details of construction which will become apparent from the following specification and accompanying drawing, wherein.

Figure 1:
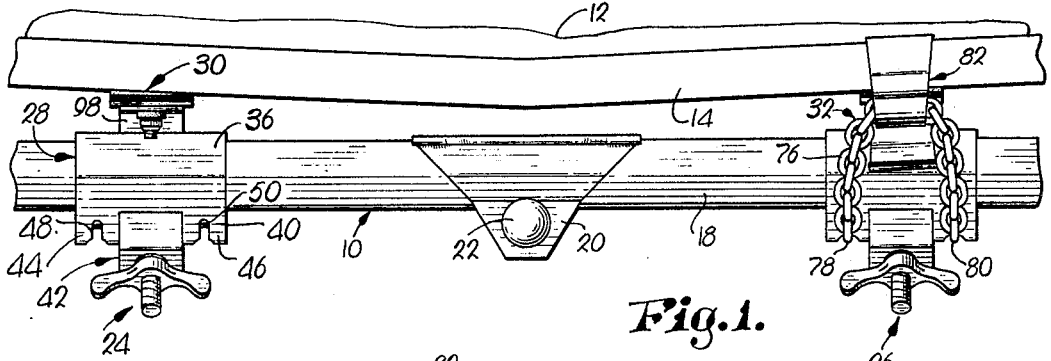
FIGURE 1 is a fragmentary, top plan view showing the trailer hitch assembly attached to one type of bumper.

The trailer hitch assembly, broadly designated by the numeral 10, is intended for use with a towing vehicle 12 having as a part thereof attachable structure such as a rear bumper 14 and rearwardly extending frame brackets 16 which secure the bumper 14 to the main frame of the towing vehicle 12.

Trailer hitch assembly 10 includes, as its primary components, a drawbar 18, which drawbar 18 has fixedly secured thereto substantially centrally thereof a shelf 20, which shelf carries a ball 22, the ball 22 being adapted to receive the socket of a tongue which is conventionally provided on towed vehicles such as trailers or the like. Assmbly 10 also includes a pair of hitch units 24 and 26 which are carried by the drawbar 18, said hitch units 24 and 26 being identical in construction and two of such units normally being provided in order to securely attach the drawbar 18 to the towing vehicle 12. Inasmuch as said hitch units 24 and 26 are identical in construction only one of the same will be described hereinafter, reference being particularly made to FIGS. 2 and 3 of the drawing.

The hitch unit, such as 24 for example, includes a mount 28, which mount 28 is carried by the drawbar 18 and engages the bumper 14 through a bumper-engaging member 30. Mount 28 is attached to the structure of the towing vehicle through first releasable mechanism 32 and second releasable mechanism 34 which will be hereinafter described in greater detail.

Mount 28 is in the nature of an integral component, the same presenting a tubular portion 36 which, in the embodiment chosen for illustration, is substantially square in transverse cross-sectional configuration whereby to present an opening 38 which is slightly larger than the outside dimension of the drawbar 18, which drawbar 18 is likewise square in cross-sectional configuration in the embodiment chosen for illustration, all to the end that mount 28 may be carried by drawbar 18 as by telescoping tubular portion 36 over drawbar 18, it being noted that when this is done, the unit 24 may be freely moved longitudinally of the drawbar 18 whereby to position the same on the drawbar in the desired location with respect to the bumper 14 of the towing vehicle 12. It is desirable that the units 24 and 26 each be positioned adjacent a frame bracket 16 of the towing vehicle 12 so that said units may be attached thereto.

A plate 40 is formed integrally with tubular portion 36 and extends outwardly from the normally uppermost surface of said tubular portion whereby to lie in essentially the same plane as said upper portion and embrace a sleeve 42, which sleeve 42 is formed integrally with the tubular portion 36. Thus, plate 40, in effect, presents a pair of wings 44 and 46, there being a wing on each side of sleeve 42 and each wing having formed therein a notch 48 and 50 respectively for purposes which will become apparent.

Figure 2:
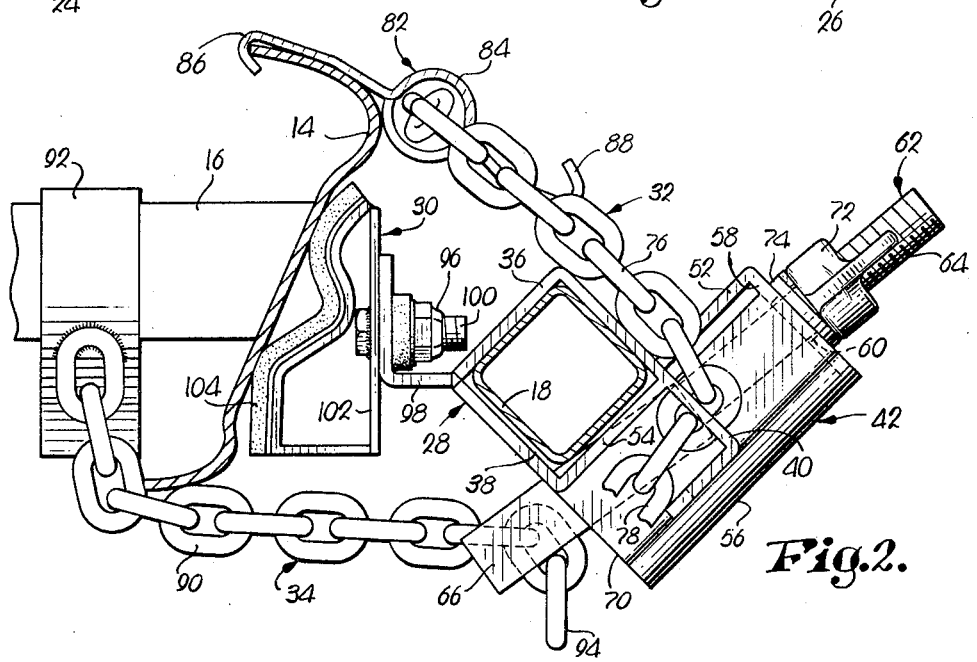
FIG. 2 is a fragmentary, substantially central, vertical cross-sectional view of a hitch unit showing the same mounted on a bumper.
Figure 3:
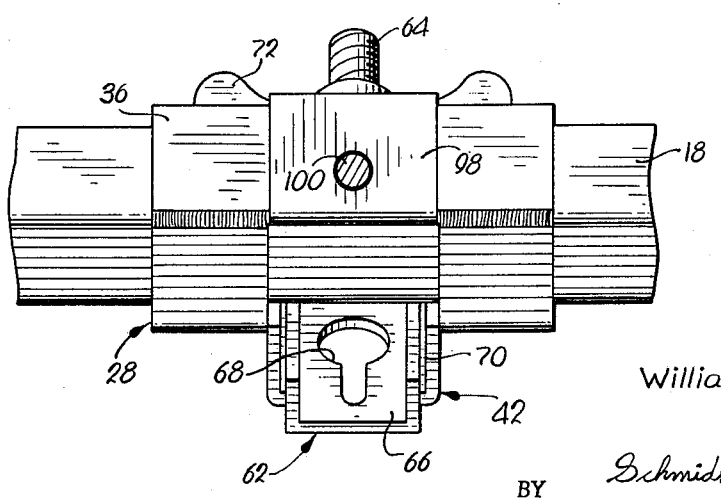
FIG. 3 is a fragmentary, front elevational view of a hitch unit with the bumper-engaging member being removed to illustrate details of construction.

The sleeve 42 extends in a generally vertical direction although the same is inclined with respect to the horizontal, the sleeve 42 having a front wall 52 which lies in an inclined plane substantially coincident with the rear wall 54 of tubular portion 36 as is shown in FIG. 2; sleeve 42 also including a rear wall 56, suitable sidewalls and a top wall 58 having a hole 60 therethrough.

Take-up means 62 is carried by the sleeve 42, the take-up means 62 including a screw 64 which extends into the normally uppermost end of sleeve 42, viewing FIG. 2, and a key plate 66 integral with screw 64 at the lowermost end thereof, said key plate 66 having a keyhole slot 68 formed therein, the key plate 66 being U-shaped in transverse cross-sectional configuration and extending out of the other end of sleeve 42 through an opening 70 which is defined by said other end of sleeve 42. A wing nut 72 is carried by screw 64 and bears against a suitable washer 74, which washer 74 overlies hole 60 and bears against the upper surface 58 of the sleeve 42.

In order to attach the mount 28 to the towing vehicle 12, there is provided first releasable mechanism 32, which mechanism is in the form of a length of chain 76, said length of chain having a pair of free ends 78 and 80, there being a latch 82 carried intermediate said ends 78 and 80, the latch presenting an eye 84 through which the chain 76 is passed, all in the manner as shown in FIGS. 1 and 2 of the drawing. It will be noted that latch 82 includes a pair of hook-like catches 86 and 88 at opposite ends thereof, said catches being alternately usable depending upon the configuration of the bumper 14 to which the assembly 10 is to be attached, it being noted that hook-like catches 86 and 88 are of different configurations whereby to accommodate each of the same to a different type or shape of bumper.

Mount 28 is also secured to the towing vehicle 12 by means of second releasable mechanism 34, which mechanism consists of a chain 90 having a hook 92 carried at one end thereof and attachable to the frame bracket 16. The other end 94 of chain 90 is free and is adapted to be engaged with the keyhole slot 68 of key plate 66, one link of the chain 90 being seated within the slot 68, the links on each side thereof precluding movement of the end 94 of chain 90 with respect to key plate 66 once the same has been so engaged.

The mount 28 is also provided with bumper-engaging member 30, which member 30 is shiftably secured to the mount 28 by apparatus 96, which apparatus includes an L-shaped arm 98 having the horizontal leg thereof suitably secured to the tubular portion 36 of mount 28, the vertical leg thereof receiving a pivot pin 100 which extends through said vertical leg and also through a backing plate 102.

A cushion 104 is secured to the face of bumper-engaging member 30, said cushion 104 being intended to engage the rear face of the bumper 14 as is clearly illustrated in FIG. 2 and so that the metallic surface of the bumper 14 will not become scratched during use of the hitch assembly 10. As is apparent, the member 30 may be rotated about pivot 100 whereby to vary the vertical inclination of the plane presented by the face of cushion 104, all to the end that the hitch unit 24 may be accommodated to bumpers of different configuration or of different vertical inclination. Thus member 30 may be rotated 180° from the position shown in FIG. 2 whereby the face of cushion 104 assumes a different vertical plane, thereby permitting the mount 28 to be suitably attached to a towing vehicle having a rear bumper of an inclination and configuration other than that illustrated in the drawing.

When the hitch assembly 10 is to be attached to a towing vehicle 12, the same is initially lifted to a position placing the drawbar 18 and the hitch units 24 and 26 into close proximity to the bumper 14 of the towing vehicle. The latch 82 of each hitch unit is then positioned so that the selected hook-like catch thereof may be placed over the upper free edge of the bumper 14 in the manner illustrated in FIG. 2 of the drawing. The free ends 78 and 80 of the chain of the first releasable mechanism 32 are then locked into their corresponding notches 48 and 50 whereby to, in effect, suspend the hitch unit from the bumper. When this is done the cushion 104 is moved into engagement with the bumper, thereby positioning the hitch units at the desired locations. As pointed out above, the vertical plane presented by the cushion 104 may be varied, depending upon the configuration of the bumper to which the assembly 10 is to be attached.

The second releasable mechanism 34 is then utilized to attach the mount 28 to the towing vehicle 12, this being accomplished by placing hook 92 over the frame bracket 16 and, with the free end 94 of chain 90 being received within slot 68 of key plate 66, the take-up means 62 is actuated by tightening wing nut 72, thereby drawing chain 90 into a taut condition.

It is to be noted that when the take-up means 62 is actuated whereby to tighten the second releasable mechanism 34, the positioning of the chain 90 will cause key plate 66 of take-up means 62 to swing forwardly through an opening in the rear wall 54 of tubular member 36 and thereby move into engagement with the drawbar 18 thus forcing drawbar 18 against the front and top walls of tubular portion 36 and thereby tightly clamping the same in said position whereby to securely retain the drawbar 18 with repsect to tubular portion 36 of mount 28. The operation of take-up means 62 not only serves to tighten the second releasable mechanism 34, but also to tightly retain the mount 28 with respect to the drawbar 18. After such relationship has been obtained the first releasable mechanism 32 may be further tightened by hand if such is necessary.

It will be appreciated that the entire operation of attaching assembly 10 to vehicle 12 is quickly and easily accomplished without the necessity of utilizing any tools or complicated connection means and, additionally, the various adjustable features of the hitch assembly 10 as hereinabove described are such that the assembly 10 can be accommodated universally to any known vehicle such as a car, truck or other towing vehicle.

A hitch assembly such as hereinabove described is especially valuable to the trailer rental industry since the hitch provided by such companies should be universally adaptable to various styles of bumpers so that each trailer distributing outlet will not have to stock a large variety of hitches to accommodate the various types of towing vehicles which the distributor's customers may use.

Another advantage of the hitch assembly hereinabove described is that the same is attached not only to the bumper 14 of the towing vehicle, but also to the frame thereof, through mechanism 34 and further, the drawbar is positioned in close relationship to the bumper 14, thereby placing the ball 22 of the assembly 10 in close proximity to said bumper whereby the weight placed on the assembly 10 by the towed vehicle is positioned as close as is possible to the towing vehicle and the points of attachment of the hitch assembly 10 thereto.

Having thus described the invention, what is claimed as new and desired to be secured by Letters Patent is:

1. In a hitch for coupling a towed vehicle to attachable structure on a towing vehicle:
   a drawbar;
   a mount carried by said drawbar and adapted to engage said structure, said mount including a sleeve;
   a first releasable mechanism for attaching said mount to said structure;
   a second releasable mechanism for attaching said mount to said structure; and
   take-up means for said second releasable mechanism, said means being carried by said sleeve and including a threaded portion and a key plate portion, said key plate portion coupled with said second releasable mechanism and engageable with said drawbar when said second mechanism is taken up whereby to clamp said drawbar with respect to said mount, said first and second releasable mechanism cooperating to tightly retain said drawbar with respect to said structure.

2. The invention of claim 1, said mount including a plate embracing said sleeve, said plate having notches formed therein for receiving said first releasable mechanism.

3. The invention of claim 1, said second releasable mechanism being in the form of a chain, one end thereof being coupled with said key plate, the other end having a hook thereon and being attached to said structure.

4. The invention as set forth in claim 2, said first releasable mechanism being in the form of a chain, the free ends thereof being received by corresponding notches, and a latch carried intermediate the ends thereof and being attached to said structure.

5. The invention of claim 2, said mount including a member for engaging said structure, there being apparatus shiftably securing said member to said mount for varying the vertical inclination of the latter with respect to the structure when the member is shifted.

6. The invention of claim 5, wherein said structure includes a bumper and a frame attaching the bumper to the towing vehicle, said member presenting a bumper-engaging area lying in a plane, said apparatus permitting shifting of said member to vary the vertical inclination of said plane.

7. The invention of claim 6, said mount including a tubular portion surrounding said drawbar, said sleeve and said plate being integral with said tubular portion, said member being carried by an arm extending from said tubular portion, said apparatus securing said member to said arm.

References Cited

UNITED STATES PATENTS 3,113,789   12/1963   Safford _____ 280—502

LEO FRIAGLIA, Primary Examiner

ROBERT R. SONG, Assistant Examiner